United States Patent [19]

Brinkmeier et al.

[11] Patent Number: 4,462,779
[45] Date of Patent: Jul. 31, 1984

[54] APPARATUS FOR INJECTING AIR OR GAS INTO A TUBULAR FILM BUBBLE

[75] Inventors: Friedhelm Brinkmeier, Lengerich of Westphalia; Heinrich Frommeyer, Hagen of Westphalia, both of Fed. Rep. of Germany

[73] Assignee: Windmöller & Hölscher, Lengerich, Fed. Rep. of Germany

[21] Appl. No.: 377,058

[22] Filed: May 11, 1982

[30] Foreign Application Priority Data

May 13, 1981 [DE] Fed. Rep. of Germany ....... 3119006

[51] Int. Cl.³ .............................................. B29D 7/24
[52] U.S. Cl. .................................... 425/140; 264/40.3; 264/564; 264/567; 425/326.1; 425/387.1
[58] Field of Search ..................... 425/135, 140, 72 R, 425/172, 326.1, 387.1, 535–536; 264/40.3, 564–569

[56] References Cited

U.S. PATENT DOCUMENTS

| 2,750,624 | 6/1956 | Coates et al. | 425/326.1 |
| 3,160,687 | 12/1964 | Andrews | 425/290 |
| 3,408,903 | 11/1968 | Lepisto et al. | 425/536 |
| 3,456,044 | 7/1969 | Pahlke | 425/72 R |
| 3,492,386 | 1/1970 | Ohmasa et al. | 264/569 |
| 3,499,064 | 3/1970 | Tsuboshima et al. | 264/569 |
| 3,555,603 | 1/1971 | Haley | 425/72 R |
| 3,562,377 | 2/1971 | Zetzsche | 264/156 |
| 4,290,996 | 9/1981 | Hayashi et al. | 425/326.1 |

FOREIGN PATENT DOCUMENTS

| 52-10155 | 3/1977 | Japan | 264/567 |
| 448683 | 9/1975 | U.S.S.R. | 425/290 |

Primary Examiner—Jeffery R. Thurlow
Attorney, Agent, or Firm—Fleit, Jacobson, Cohn & Price

[57] ABSTRACT

To maintain an air or gas bubble forming in a moving tube of plastics material between pairs of squeeze rollers, an air or gas injecting needle is mounted to pivot substantially in a plane containing centreline of the tube. The needle pierces the tube wall of the bubble when in one rotary position, moves with the tube while pivoting through an arc depending on the depth of needle penetration and is withdrawn from the bubble in a second rotary position.

12 Claims, 1 Drawing Figure

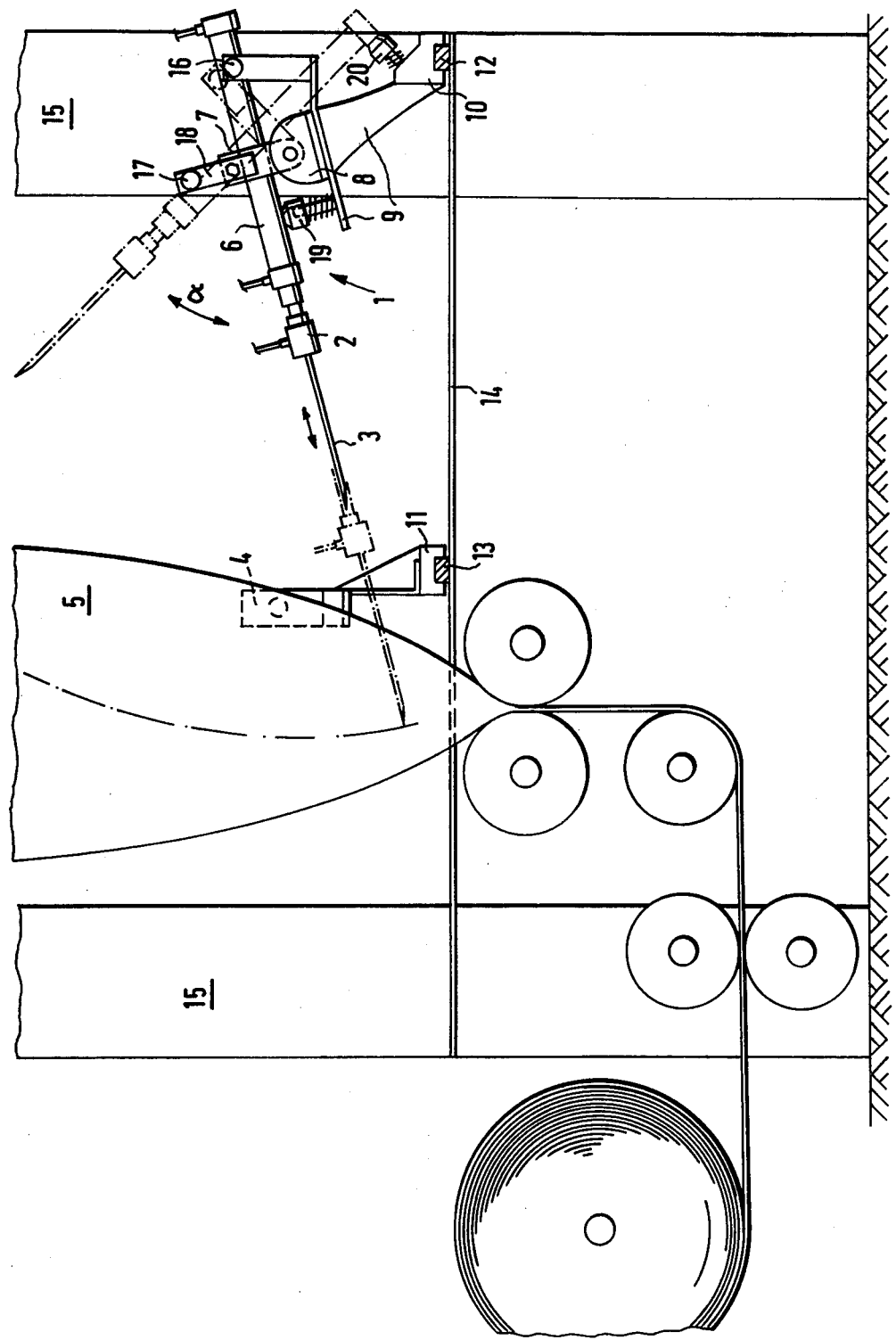

APPARATUS FOR INJECTING AIR OR GAS INTO A TUBULAR FILM BUBBLE

The invention relates to an apparatus for injecting air or gas with a needle into a bubble formed by squeeze rollers in a moving web of tubular film.

To produce side folds in a flattened web of tubular film which is, for example, uncoiled from a reel, it is known to inflate the tube of film in the zone between two pairs of squeeze rollers so that side folds can then be formed in the tube bubble by means of side blades and possibly guide plates. Since the squeeze rollers cannot completely seal the bubble by squeezing, constant air losses occur and this makes it necessary to inject air into the bubble at certain intervals to ensure the trouble-free formation of the side folds.

Hitherto, it has been usual for the operator of the machine to inspect the bubble or to monitor the bubble by means of a photo-scanner or the like which, when the bubble diameter drops below a permissible value, releases a signal so that the operator can when necessary replenish the air in the now slackened bubble by means of an air gun fitted with an injecting needle.

It is the problem of the invention to provide an apparatus which automatically injects air or gas when necessary into a bubble which has become too slack.

According to the invention, this problem is solved in that the injecting needle charged with compressed air or gas is pivotable substantially in a plane containing the centreline of the tubular film and with such a pivot circle that the point of the needle pierces the bubble wall end, after moving therewith for a distance corresponding to the depth of needle penetration, leaves the bubble again.

According to a particularly advantageous embodiment of the invention, the injecting needle is longitudinally displaceable on a pivotable carrier and is projectable in its lower position to pierce the bubble wall and retractable in its upper pivotal position, the needle being returnable from its upper to its lower pivotal position when in its retracted position. The carrier may consist of a piston-cylinder unit at the front end of the piston rod of which there is secured an air supply connector with an injecting needle. The upper pivotal position of the needle may be defined by a limit switch, for example a magnetic switch.

Desirably, the cylinder of the piston-cylinder unit is mounted so that it tilts back to its starting position under the weight of its front portion carrying the injecting needle and the air supply member. Since the injecting needle that is shot into the tube bubble is carried along by the tube of film, special pivotal drives can be dispensed with. The end positions of the piston-cylinder unit are preferably limited by buffers which prevent a hard impact. In the case of thin-walled films or those which tear easily, to prevent tearing of the hole pierced by the injecting needle when the latter is suddenly accelerated by the wall of the film to a circumferential speed corresponding to the speed of film movement, means may be provided for accelerating the injecting needle to a circumferential speed corresponding to the speed of the tubular web. These means may consist of a fixed run-up cam or a suitably shaped guide plate on which the piston rod or a part connected thereto runs.

According to a further development of the invention, the injecting needles are secured to project radially from a constantly rotating wheel. This wheel rotates constantly together with the web of tubular film and the injecting needles secured thereto pierce the tubular film bubble according to their distribution over the circumference and maintain its inflation. There need be no special drive for the wheel because it is carried along by the wall of the tubular film bubble. The piercing distance corresponds to the chord-like portion of the circular path described by the injecting needles and formed by the bubble wall.

One example of the invention is described in more detail with reference to the drawing of which the single FIGURE is a side elevation of the apparatus for injecting blown air into a tubular bubble.

A pneumatic piston-cylinder unit 1 is pivotably mounted in the frame 15 of the machine. An air connector 2 with an injecting needle 3 is secured to the front end of the piston rod. If, now, the light barrier 4 indicates that the diameter of the bubble 5 has decreased to below a permissible extent, the piston of the pneumatic piston-cylinder unit 1 is projected and the hollow needle 3 is shot into the bubble 5. At the same time as shooting the needle 3, the needle is itself subjected to air through the air connector 2 so that air is blown into the bubble 5. During continued upward movement of the bubble 5, the injecting needle 3 (projected position in broken lines) is moved upwardly through an angle $\alpha$ by the bubble 5 itself, the cylinder 6 of the piston-cylinder unit 1 being pivoted. For this purpose, the cylinder 6 is held by a bracket 7 which is pivotable in a plummer block 8 secured to a guide member 10 by a holder 9. This guide member 10 is movable on rails 12 or 13, as is the guide member 11 to which the light barrier 4 is connected. These rails 12 and 13 are screwed to a crossmember 14 fixed to the machine frame 15. The pivoting distance of the piston-cylinder unit 1 is determined by a magnetic switch 16 which is secured to the holder 9 and which is acted upon by a magnetic plate 17. This magnetic plate 17 is secured over an adjustable arm 18 so that, by adjusting the magnetic plate 17, the pivoting angle $\alpha$ and thus the penetration of the injecting needle in the bubble can be changed. Thus, as soon as the magnetic plate 17 reaches the region of the magnetic switch 16, the air for injecting is switched off and the air for the piston cylinder unit 1 is reversed so that the piston is retracted into the cylinder 6. The cylinder 6 will then fall back to its basic position under gravity. The impact is damped by a buffer 19 secured to the holder 9. Since it is possible to move the bubbles at different speeds, it is also desirable to provide a further buffer 20 which is connected to the guide member 10. This buffer 20 prevents the cylinder 6 from continuing to turn clockwise under its inertia forces when the injecting needle 3 has already been withdrawn from the bubble 5.

In practice, the operation is not always with one bubble. Instead, one strives to operate in several stages to achieve as high an output of material as possible. This means that several bubbles are juxtaposed in a single machine. Consequently, there must be as many injecting needles 3 as the maximum number of bubbles to be employed. If, now, two larger bubbles are to be used instead of, say, three bubbles, it is necessary to bring one of three injecting needles into a standby position and the other two needles into an operative position. To achieve this, the photocells as well as the pneumatic piston-cylinder units are displaceable on the rails 13 or 12, respectively, as previously described.

We claim:

1. Apparatus for injecting a compressed gas, by an injection needle, into a bubble formed by squeeze rollers in a moving web of tubular film, said apparatus comprising:
   an injection means adapted for injection of a compressed gas into said bubble, said injection means is pivotable about an axis transverse to a plane passing through a centerline of said tubular web;
   moving means for moving said injection means between a first position during which said injection means extends and pierces said bubble and a second position during which said injection means retracts from said bubble;
   means for releasing said compressed gas at said first position and halting the release of said compressed gas at said second position; and
   means for accelerating said injection means to a circumferential speed corresponding to the speed of said tubular film.

2. An apparatus as in claim 1, wherein said moving means includes a means for extending and extracting said injection means.

3. An apparatus as in claim 1, wherein said means for extending and retracting said injection means comprises a piston cylinder assembly with a connective means for supplying said compressed gas to said injection means.

4. An apparatus as in claim 3, wherein said second position is determined by means of a limit switch.

5. An apparatus as in claim 4, wherein at said second position, after said injection means has been retracted from said bubble, said injection means returns to said first position.

6. An apparatus as in claim 5, wherein buffer means define the limit position of said first and second positions.

7. An apparatus as in claim 3, wherein said piston cylinder and said means for supplying said compressed gas are controlled by a photoscanner for scanning the diameter of the bubble.

8. An apparatus as in claim 1, wherein said axis is parallel to an axis of said squeeze roller.

9. An apparatus as in claim 7, wherein said injection means and said photoscanner are mounted on bearings movable on guides.

10. An apparatus as in claim 1, wherein said means for accelerating said injection means comprises a run-up cam.

11. An apparatus as in claim 1, wherein said means for accelerating said injection means comprises a guide plate.

12. An apparatus as in claim 1, wherein said injection means is pivotable substantially in said plane passing through a centerline of said tubular web.

* * * * *